(12) United States Patent
Hefler et al.

(10) Patent No.: US 7,950,373 B2
(45) Date of Patent: May 31, 2011

(54) CHECK VALVE WITH SEPARATE SPHERICAL SPRING GUIDE

(75) Inventors: Gregory W. Hefler, Chillicothe, IL (US); Michael C. Long, Metamora, IL (US); Senthilkumar Rajagopalan, Edwards, IL (US); Donald A. Fuller, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 341 days.

(21) Appl. No.: 12/222,711

(22) Filed: Aug. 14, 2008

(65) Prior Publication Data

US 2010/0037965 A1 Feb. 18, 2010

(51) Int. Cl.
*F02M 37/04* (2006.01)
*F02M 37/06* (2006.01)

(52) U.S. Cl. ...................................... 123/511

(58) Field of Classification Search .................. 123/511, 123/457, 459; 137/538, 535, 537, 543.19, 137/543.17; 251/175
See application file for complete search history.

(56) References Cited

U.S. PATENT DOCUMENTS

| | | | |
|---|---|---|---|
| 1,120,118 A | 12/1914 | Ashlock | |
| 1,635,371 A | 7/1927 | Levenson | |
| 1,807,970 A | 6/1931 | Davis | |
| 2,764,996 A | 10/1956 | Brown | |
| 2,841,174 A | 7/1958 | Frye | |
| 2,912,001 A * | 11/1959 | Green | 137/516.29 |
| 3,513,872 A * | 5/1970 | Tupper et al. | 137/484.2 |
| 3,893,476 A | 7/1975 | Stroh | |
| 4,062,517 A | 12/1977 | Jones | |
| 4,172,469 A * | 10/1979 | Boehringer | 137/512.3 |
| 4,459,963 A | 7/1984 | Werner et al. | |
| 4,665,943 A | 5/1987 | Medvick et al. | |
| 4,889,151 A * | 12/1989 | Oten | 137/71 |
| 5,065,790 A * | 11/1991 | Kornas | 137/514.5 |
| 5,427,144 A * | 6/1995 | Teets et al. | 137/614.2 |
| 5,979,409 A | 11/1999 | Robinson | |
| 6,244,295 B1 | 6/2001 | Bartussek et al. | |
| 6,830,034 B2 | 12/2004 | Engelmeyer et al. | |
| 7,290,562 B2 | 11/2007 | Kane | |
| 2004/0001900 A1* | 1/2004 | Dominka | 425/130 |

FOREIGN PATENT DOCUMENTS

| | | |
|---|---|---|
| JP | 11-210459 | 8/1999 |
| JP | 11-257188 | 9/1999 |
| KR | 20-1990-0004694 | 5/1990 |
| KR | 20-0231065 | 7/2001 |
| KR | 10-0774700 | 11/2007 |

* cited by examiner

*Primary Examiner* — Mahmoud Gimie
(74) *Attorney, Agent, or Firm* — Finnegan, Henderson, Farabow, Garrett & Dunner LLP

(57) ABSTRACT

A check valve for use with a pump is disclosed. The check valve may have a body at least partially defining a central bore with an open end and a closed end, and a spring guide separate from the body and disposed within the closed end of the central bore. The check valve may also have a spring located within the central bore and having a first end operatively engaged with the spring guide, and a valve element operatively engaged with a second end of the spring and being movable by a pressure differential to compress the spring. The spring guide may be moveable relative to the body.

20 Claims, 2 Drawing Sheets

CHECK VALVE WITH SEPARATE SPHERICAL SPRING GUIDE

TECHNICAL FIELD

The present disclosure relates generally to a check valve, and more particularly to a check valve having a separate spherical spring guide.

BACKGROUND

Common rail fuel systems typically employ multiple injectors connected to a common rail or manifold that is provided with high-pressure fuel. In order to efficiently accommodate different combinations of fuel injections at a variety of timings and injection amounts, the systems generally include a variable discharge pump in fluid communication with the common rail. One type of variable discharge pump is the cam driven, inlet or outlet metered pump.

A cam driven, inlet or outlet metered pump generally includes multiple plungers, each plunger being disposed within an individual pumping chamber. The plunger is connected to a lobed cam by way of a follower, such that, as the cam rotates, an associated lobe(s) causes the plunger to withdraw from the pumping chamber to draw fluid into the chamber, and then drives the plunger into the pumping chamber to displace fuel from the pumping chamber past an outlet check valve and into the common rail. The outlet check valve ensures that only fluid having a minimum threshold pressure passes into the common rail and that fluid from the common rail is inhibited from passing back into the pump.

Although effective, current outlet check valves used in pumping applications may be difficult and expensive to machine, and may have reduced durability. Thus, a new type of check valve may be useful for these applications.

An exemplary outlet check valve for use in a pumping application is disclosed in U.S. Pat. No. 6,244,295 (the '295 patent) issued to Bartussek et al. on Jun. 12, 2001. The '295 patent discloses an outlet check valve having a tubular valve housing in which a valve ball is received. The outlet check valve also has a perforated disk press-fitted between longitudinally-extending guide ribs and a circumferential wall of the valve housing. A helical compression spring is braced against the perforated disc and presses the valve ball against a valve seat. A collar is included on the perforated disc for centering the spring. The valve housing is made separate from the perforated disc.

During operation, the outlet check valve of the '295 patent allows fluid displaced by a pump piston to pass through the valve in a single direction. Specifically, as fluid comes into contact with the valve ball, it pushes the valve ball away from the seat and against the bias of the spring to compress the spring. As the valve ball moves away from the seat, the fluid is allowed to pass around the ball through an axial hole in the perforated disc to exit the check valve.

Although perhaps simple and inexpensive to fabricate, the outlet check valve of the '295 patent may still be problematic. Specifically, because the perforated disc is press fitted into the valve housing, it may be inhibited from moving during operation of the check valve. And, as the perforated disc functions as a spring guide, the fixed nature of the guide may provide opportunities for misalignment and binding of the spring and valve ball.

The disclosed check valve is directed to overcoming one or more of the problems set forth above and/or other problems of the prior art.

SUMMARY

In one aspect, the present disclosure is directed to a check valve. The check valve may include a body at least partially defining a central bore with an open end and a closed end, and a spring guide separate from the body and disposed within the closed end of the central bore. The check valve may also include a spring located within the central bore and having a first end operatively engaged with the spring guide, and a valve element operatively engaged with a second end of the spring and being movable by a pressure differential to compress the spring. The spring guide may be moveable relative to the body.

In another aspect, the present disclosure is directed to another check valve. This check valve may include a body at least partially defining a central bore having an open end and a closed end, and a spring guide having a spherical portion received by the closed end of the central bore. The check valve may also include a spring disposed within the central bore and having a first end operatively engaged with a portion of the spring guide opposite the spherical portion, and a valve element operatively engaged with a second end of the spring and being movable by a pressure differential to compress the spring.

DETAILED DESCRIPTION

Figure 1:
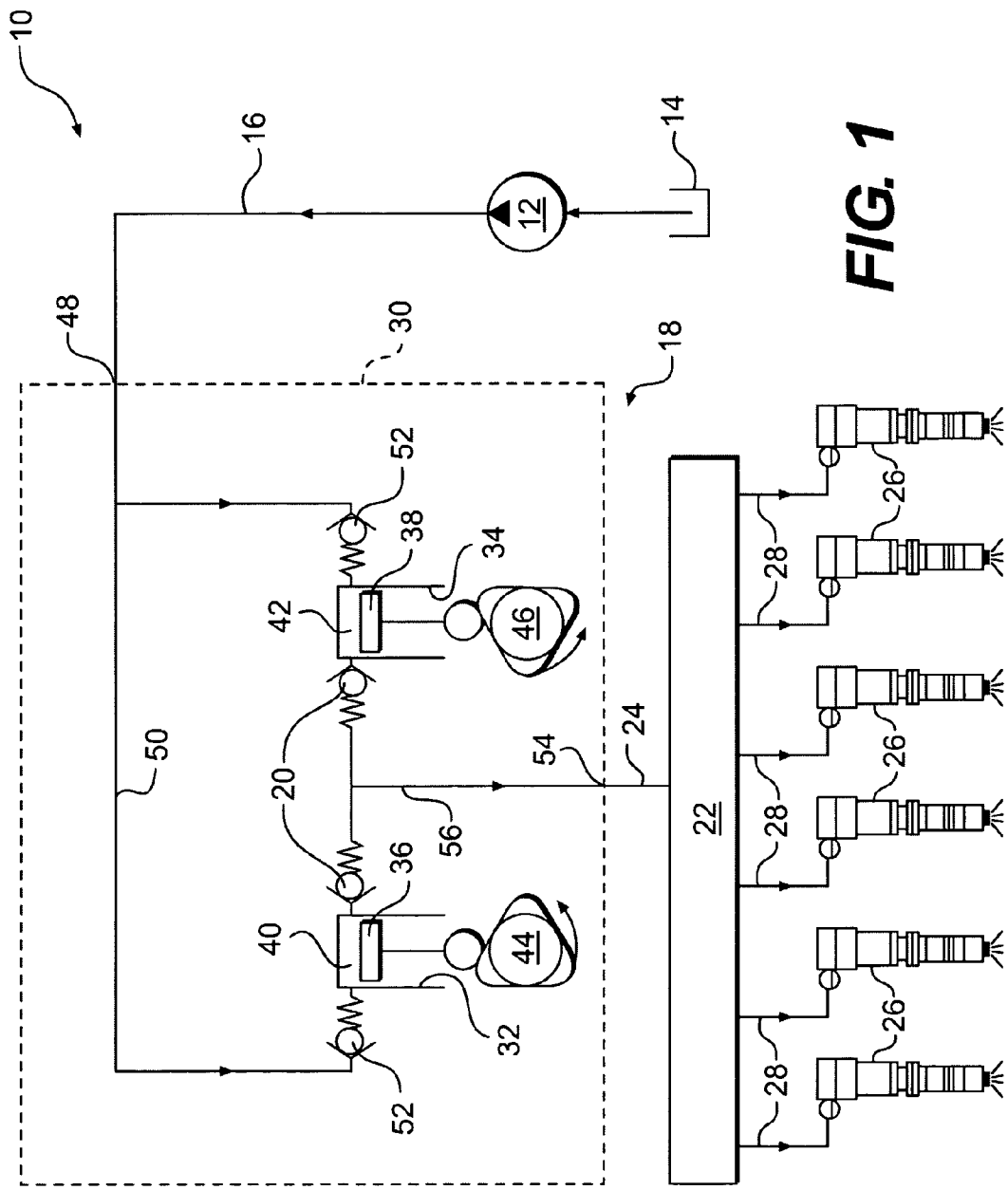
FIG. 1 is a schematic illustration of an exemplary disclosed fuel system.

FIG. 1 illustrates an exemplary fuel system 10 for use with a combustion engine (not shown), for example a gasoline, diesel, or gaseous fuel-powered internal combustion engine. In one embodiment, fuel system 10 may be a common rail fuel system including a fuel transfer pump 12 configured to transfer fuel from a low-pressure reservoir 14 through a fluid passage 16 to a high-pressure pump 18. High-pressure pump 18 may pressurize the fuel and direct the pressurized fuel past one or more outlet check valves 20 and to a common rail 22 by way of a fluid passage 24. A plurality of fuel injectors 26 may be situated to receive pressurized fuel from common rail 22 via individual fluid passages 28, and to inject at least a portion of the received fuel into associated combustion chambers of the engine.

High-pressure pump 18 may include a housing 30 at least partially defining first and second barrels 32, 34, a first plunger 36 disposed within first barrel 32, and a second plunger 38 disposed within second barrel 34. First barrel 32 and first plunger 36 together may define a first pumping chamber 40. Second barrel 34 and second plunger 38 together may define a second pumping chamber 42. Although high-pressure pump 18 is shown in FIG. 1 as having two pumping chambers, it is contemplated that any number of pumping chambers may be included within high-pressure pump 18.

A first driver 44 and a second driver 46 may be operatively connected to first and second plungers 36, 38, respectively. First and second drivers 44, 46 may each include any mechanism for driving first and second plungers 36, 38 such as, for example, a multi-lobed cam, a solenoid actuator, a piezo actuator, a hydraulic actuator, a motor, or any other driving mechanism known in the art. A rotation of first driver 44 may result in a corresponding reciprocation of first plunger 36 with first barrel 32, and a rotation of second driver 46 may result in a corresponding reciprocation of second plunger 38 within second barrel 34. Each of first and second drivers 44, 46 may be operatively connected to and driven by the associated combustion engine.

High-pressure pump 18 may also include an inlet 48 and a low-pressure gallery 50. Inlet 48 may fluidly connect high-pressure pump 18 to fluid passage 16, and low-pressure gallery 50 may fluidly connect inlet 48 with first and second pumping chambers 40, 42. One or more inlet check valves 52 may be disposed between low-pressure gallery 50 and first and second pumping chambers 40, 42 to allow a unidirectional flow of low-pressure fuel from low-pressure gallery 50 to first and second pumping chambers 40, 42 (i.e., to inhibit fuel flow from first and second pumping chambers 40, 42 to low-pressure gallery 50).

High-pressure pump 18 may also include an outlet 54 and a high-pressure gallery 56. Outlet 54 may fluidly connect high-pressure pump 18 with fluid passage 24, and high-pressure gallery 56 may fluidly connect first and second pumping chambers 40, 42 with outlet 54. Outlet check valves 20 may be disposed within high-pressure gallery 56 to allow a unidirectional flow of high-pressure fuel from high-pressure gallery 56 to common rail 22 (i.e., to inhibit fuel flow from common rail 22 to high-pressure gallery 56).

In some embodiments, a spill control valve not shown may be disposed within a spill passageway fluidly communicating first and second pumping chambers 40, 42 with low pressure gallery 50 to selectively allow some of the fluid displaced from first and second pumping chambers 40, 42 to flow into low-pressure gallery 50. It should be noted that the amount of fluid displaced (i.e., spilled) from first and second pumping chambers 40, 42 into low-pressure gallery 50 may be inversely proportional to the amount of fluid displaced (i.e., pumped) into high-pressure gallery 56. It is contemplated that inlet check valves 52 may additionally function as or be replaced by the spill control valve in some applications, if desired.

Figure 2:
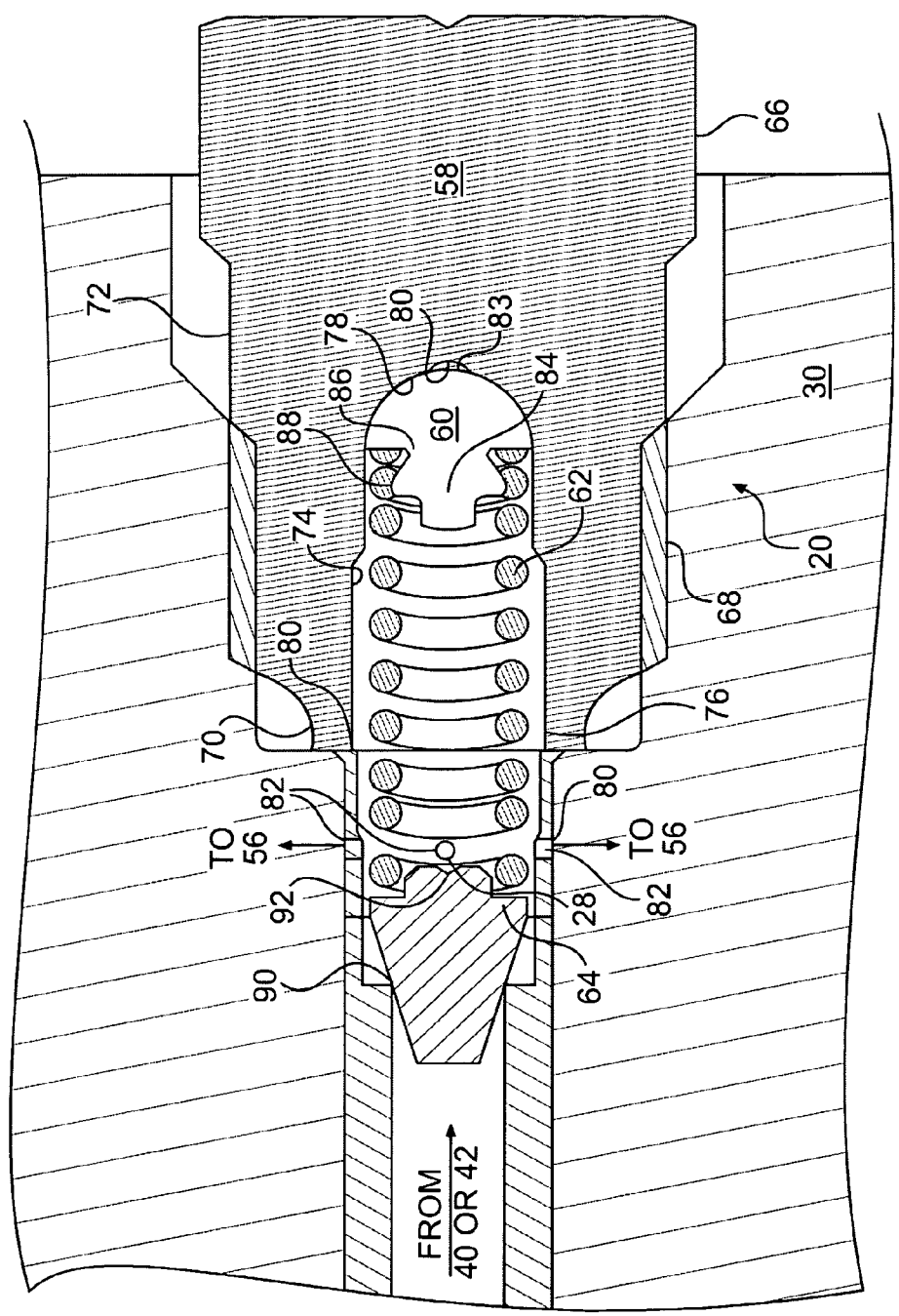
FIG. 2 is an enlarged cross-sectional view of an exemplary disclosed check valve that may be used with the fuel system of FIG. 1.

As illustrated in FIG. 2, outlet check valve 20 may include multiple components that cooperate to provide the unidirectional flow of fuel from first and second pumping chambers 40, 42 to high-pressure gallery 56. Specifically, outlet check valve 20 may include a body 58, a spring guide 60 separate from and disposed with body 58, a spring 62 operatively connected to spring guide 60, and a valve element 64 disposed within body 58 and biased by spring 62 away from spring guide 60. As will be described in more detail below, in response to a pressure differential across valve element 64, spring 62 may compress to allow fuel to pass from first and second pumping chambers 40, 42 to high-pressure gallery 56.

Body 58 may be a generally cylindrical member configured to threadingly engage housing 30 of high-pressure pump 18. In particular, body 58 may include a base portion 66, a threaded portion 68, a first non-threaded portion 70 located at a tip end of body 58 opposite base portion 66, and a second non-threaded portion 72 located between base portion 66 and threaded portion 68. First and second non-threaded portions 70, 72 may each embody straight-walled, external cylindrical portions of body 58. First non-threaded portion 70 may have a diameter smaller than a diameter of threaded portion 68. Second non-threaded portion 72 may have a diameter about equal to the diameter of threaded portion 68. Although second non-threaded portion 72 is shown as having an axial length longer than an axial length of first non-threaded portion 70 and being shorter than an axial length of threaded portion 68, it is contemplated that other length relationships may be possible. First and second non-threaded portions 70, 72 may be utilized during machining to mount, stabilize, and enhance locating of check valve features.

Body 58 may at least partially define a central bore 74. Central bore 74 may include an open end 76 and a closed end 78. Closed end 78 may be machined to have spherical geometry configured to receive spring guide 60. Closed end 78 may also include a fluid recess 80 located within the spherical geometry to promote proper seating of spring guide 60 within closed end 78 of central bore 74 (i.e., to minimize a likelihood of hydraulic interference or lock). In one example, central bore 74 may be a stepped bore, wherein open end 76 has a larger diameter than closed end 78. One or more orifices 82 may be located within an internal annular wall of central bore 74 at the larger diameter to fluidly communicate central bore 74 with high-pressure gallery 56.

Spring guide 60 may include a spherical base portion 83 and a stud 84 protruding from spherical base portion 83. In one embodiment, spherical base portion 83 may be a half-ball configured to compliment the spherical geometry at closed end 78 of central bore 74. Stud 84 may have geometry configured to engage and retain spring 62 to spherical base portion 83. In particular, stud 84 may include a first section 86 of reduced diameter proximal spherical base portion 83, and a second section 88 of enlarged diameter located distal spherical base portion 83. With this arrangement, as spring 62 is assembled to spring guide 60, one or more coils at an end of spring 62 may expand to pass over second section 88, and then contract back to a less-expanded state such that the coil is retained at first section 86 (i.e., first section 86 may extend into a center portion of spring 62 and one or more coils of spring 62 may be retained between second section 88 and spherical base portion 83).

Valve element 64 may be configured to engage a valve seat 90 to inhibit fuel flow from first or second pumping chambers 40, 42 to common rail 22 by way of orifices 82. In one embodiment, valve seat 90 may be included within housing 30 of high-pressure pump 18. As such, valve element 64 may be biased into engagement with valve seat 90 by spring 62 after assembly of outlet check valve 20 into high-pressure pump 18. In another embodiment, valve seat 90 may be included within body 58 of outlet check valve 20. Valve element 64 may be any type of element known in the art, for example, a ball valve element, a conical valve element (as shown in FIG. 2), a spool valve element, or any other suitable type of element. Valve element 64 may include a spring guide portion 92 configured to engage spring 62. In response to a pressure from first or second pumping chambers 40, 42 exceeding a pressure within central bore 74, a force may be created on valve element 64 that urges valve element 64 to compress spring 62. As spring 62 compresses, valve element 64 may be allowed to move from a flow-blocking position away from valve seat 90 toward a flow-passing position at which fuel may be allowed to pass around valve element 64 and out of check valve 20 by way of orifices 82.

INDUSTRIAL APPLICABILITY

The disclosed check valve finds potential application in any fluid system where it is desirable to control discharge from a pump. The disclosed check valve finds particular applicability as an outlet check valve in fuel injection systems, especially common rail fuel injection systems. One skilled in the art will recognize, however, that the disclosed check valve could be utilized in relation to other fluid systems that may or may not be associated with fuel delivery or an internal combustion engine. It is further contemplated that the disclosed check valve could alternatively or additionally be used to control inlet flows of fluid, if desired.

Referring to FIG. 1, when fuel system 10 is in operation, first and second drivers 44, 46 may be driven by an engine to rotate and cause first and second plungers 36, 38 to reciprocate within respective first and second barrels 32, 34, out of phase with one another. When first plunger 36 moves through an intake stroke, second plunger 38 may move through a pumping stroke.

During the intake stroke of first plunger 36, fuel may be drawn into first pumping chamber 40 via inlet check valve 52. The ensuing pumping stroke of first plunger 36 may cause an immediate build up of pressure within first pumping chamber 40. After the building pressure increases beyond a minimum threshold, a pressure differential across outlet check valve 20 may produce an opening force on valve element 64 (referring to FIG. 2) that exceeds a closing force of spring 62. When the closing force of spring 62 has been surpassed, outlet check valve 20 may open (i.e., move to the flow-passing position) and high-pressure fuel from within first pumping chamber 40 may be allowed to pass from outlet check valve 20 through orifices 82 into high-pressure gallery 56 and then into common rail 22 by way of fluid passage 24.

Toward an end of the pumping stroke, as an angle of first driver 44 causing first plunger 36 to move decreases, a reciprocating speed of first plunger 36 may proportionally decrease. And, as the reciprocating speed of first plunger 36 decreases, the opening force caused by the pressure differential across outlet check valve 20 may near and then fall below the closing force of spring 62. Valve element 64 may move to the flow-blocking position to inhibit fuel flow through orifices 82 when the opening force caused by the pressure differential across valve element 64 falls below the closing force of spring 62.

As first plunger 36 switches from pumping to filling, second plunger 38 may switch operational modes from filling to pumping. Second plunger 38 may then complete a pumping stroke similar to that described above with respect to first plunger 36.

Because spring guide 60 may be separate from body 58 and include spherical geometry that compliments the geometry at closed end 78 of central bore 74, spring guide 60 may be allowed to move (i.e., to pivot) relative to body 58 during operation of outlet check valve 20. This movement freedom may facilitate alignment of valve element 64 and spring 62 within central bore 74. And, improved alignment may minimize friction and wear of outlet check valve 20, thereby reducing a likelihood of binding and malfunction. In addition, the spherical geometry of spring guide 60 and central bore 74 may be simple and inexpensive to manufacture.

It will be apparent to those skilled in the art that various modifications and variations can be made to the outlet check valve of the present disclosure. Other embodiments will be apparent to those skilled in the art from consideration of the specification and practice of the disclosed outlet check valve. It is intended that the specification and examples be considered as exemplary only, with a true scope being indicated by the following claims and their equivalents.

What is claimed is:

1. A check valve, comprising:
   a body at least partially defining a central bore having an open end and a closed end;
   a spring guide separate from the body and disposed within the closed end of the central bore;
   a spring located within the central bore and having a first end operatively engaged with the spring guide; and
   a valve element operatively engaged with a second end of the spring and being movable by a pressure differential to compress the spring,
   wherein the spring guide is moveable relative to the body.

2. The check valve of claim 1, wherein the body includes at least one orifice located in an annular side wall of the central bore.

3. The check valve of claim 2, wherein the valve element is movable from a flow passing position at which fluid from the open end of the central bore is allowed to flow through the at least one orifice, and a flow-blocking position at which fluid flow from the open end of the central bore through the at least one orifice is inhibited.

4. The check valve of claim 1, wherein the spring guide includes a base and a stud protruding from the base, the stud being configured to engage a center portion of the spring.

5. The check valve of claim 4, wherein the stud of the spring guide includes a first proximal portion of reduced diameter proximate the base and a second distal portion of enlarged diameter, the stud being configured to retain a portion of the spring between the second distal portion and the base.

6. The check valve of claim 1, wherein the valve element includes a conical sealing surface.

7. The check valve of claim 1, wherein the spring guide is pivotally movable relative to the body.

8. The check valve of claim 7, wherein the spring guide includes an outer spherical surface configured to compliment a spherical end surface of the central bore.

9. The check valve of claim 1, wherein the body includes:
   a base portion at one end of the body;
   a non-threaded cylindrical portion located at an opposing tip end of the body; and
   a threaded portion located between the base portion and the non-threaded cylindrical portion.

10. The check valve of claim 9, wherein the non-threaded cylindrical portion is a first non-threaded cylindrical portion and the body further includes a second non-threaded cylindrical portion located between the threaded portion and the base portion.

11. The check valve of claim 10, wherein:
    the first non-threaded cylindrical portion has a diameter smaller than a diameter of the threaded portion; and
    the second non-threaded cylindrical portion has a diameter about equal to the diameter of the threaded portion.

12. The check valve of claim 10, wherein the second non-threaded cylindrical portion has an axial length longer than an axial length of the first non-threaded cylindrical portion and shorter than an axial length of the threaded portion.

13. A check valve, comprising:
    a body at least partially defining a central bore having an open end and a closed end;
    a spring guide having a spherical portion received by the closed end of the central bore, wherein a surface of the spherical portion slidably engages a surface of the closed end;
    a spring disposed within the central bore and having a first end operatively engaged with a portion of the spring guide opposite the spherical portion; and
    a valve element operatively engaged with a second end of the spring and being movable by a pressure differential to compress the spring.

14. The check valve of claim 13, wherein the body includes at least one orifice located in an annular side wall of the central bore.

15. The check valve of claim 14, wherein the valve element is movable from a flow passing position at which fluid from the open end of the central bore is allowed to flow through the at least one orifice, and a flow-blocking position at which fluid flow from the open end of the central bore through the at least one orifice is inhibited.

16. The check valve of claim 13, wherein the portion of the spring guide opposite the spherical portion includes a stud configured to engage a center portion of the spring.

17. The check valve of claim 16, wherein the stud of the spring guide includes a first proximal portion proximate the spherical portion and having a diameter less than a second distal portion, the stud being configured to retain a portion of the spring between the second distal portion and the spherical portion.

18. The check valve of claim 13, wherein the body includes:
  a base portion at one end of the body;
  a non-threaded cylindrical portion located at an opposing end of the body; and
  a threaded portion located between the base portion and the non-threaded cylindrical portion.

19. The check valve of claim 18, wherein the non-threaded cylindrical portion is a first non-threaded cylindrical portion and the body further includes a second non-threaded cylindrical portion located between the threaded portion and the base portion.

20. A fuel system, comprising:
  a tank holding a supply of fuel;
  a pump configured to draw fuel from the tank and pressurize the fuel, the pump including:
    a housing at least partially defining a pumping chamber and a discharge passage extending from the pumping chamber; and
    a plunger reciprocatingly disposed within the pumping chamber to discharge pressurized fuel from the pumping chamber to the discharge passage;
  a common rail configured to receive pressurized fuel from the pump;
  at least one fuel injector fluidly connected to the common rail; and
  an outlet check valve fluidly coupled between the pump and the common rail, the outlet check valve including:
    a body connected to the housing of the pump and at least partially defining a central bore having an open end fluidly connected to the discharge passage, a closed end, and at least one orifice fluidly extending through an annular side wall of the central bore between the open and closed ends and being fluidly connected to the common rail;
    a spring guide separate from and movable relative to the body, the spring guide having a spherical portion received by the closed end of the central bore and a stud extending from the spherical portion;
    a spring disposed within the central bore and having a first end operatively engaged with the stud of the spring guide; and
    a valve element operatively engaged with a second end of the spring and being movable by a pressure differential to compress the spring and selectively communicate the discharge passage with the common rail via the at least one orifice.

* * * * *